Aug. 13, 1963     H. P. MILLER ETAL     3,100,658
PIPE JOINT SEALING WRAPPER
Filed Jan. 27, 1958
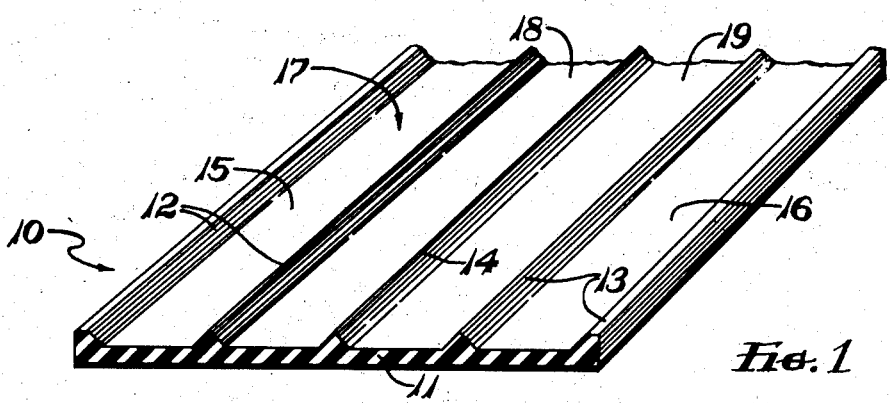
Fig. 1
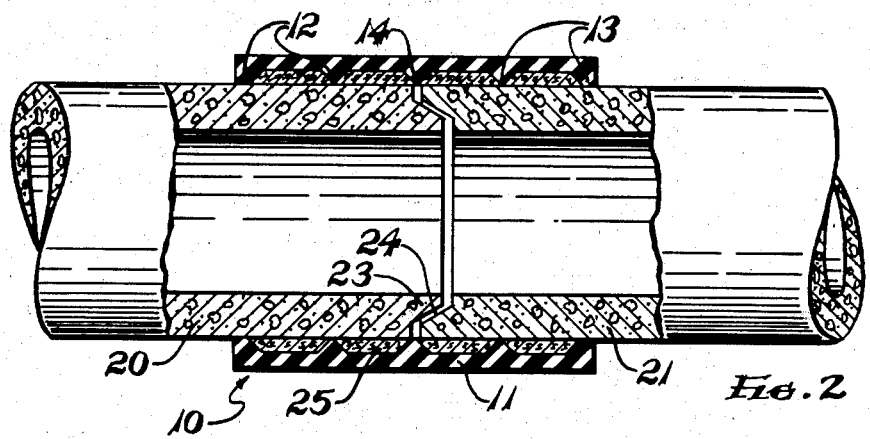
Fig. 2
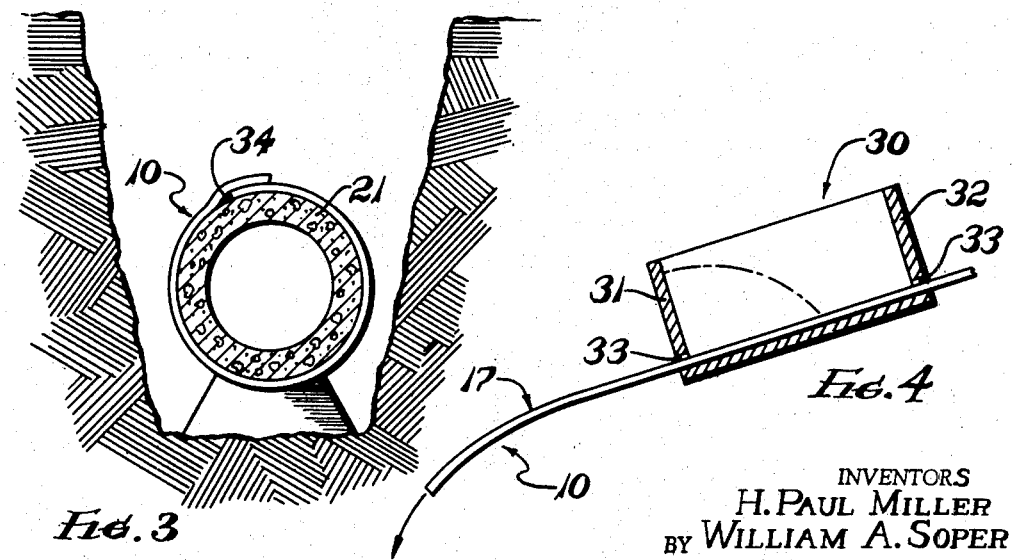
Fig. 3
Fig. 4
INVENTORS
H. PAUL MILLER
BY WILLIAM A. SOPER
John D. Haney
ATTY.

United States Patent Office 3,100,658
Patented Aug. 13, 1963

3,100,658
PIPE JOINT SEALING WRAPPER
H Paul Miller, Manton, Mich., and William A. Soper, Akron, Ohio, assignors to The B. F. Goodrich Company, New York, N.Y., a corporation of New York
Filed Jan. 27, 1958, Ser. No. 711,358
4 Claims. (Cl. 285—230)

This invention relates to joint seals for buried pipes. It has special utility in sealing adjoining ends of sewer pipes laid in wet soil where without such seals ground water would percolate through the joints to fill the pipes and load the basins or other equipment of the pipe line with objectionable water and silt deposits. The mode of sealing of this invention is also well suited for sealing joints in pipes for other purposes.

Pipe joints are sealed in accordance with this invention by enclosing the joint in a flexible, elastic rubber-like wrapper which is water-impervious and chemically inert to the pipe material and to material surrounding or carried in the pipes. The wrapper is structurally characterized by a comparatively thin elastic body portion which is adapted to circumferentially surround each of the opposing pipe ends at a joint. On the pipe-embracing side of the rubber body there is formed a series of integral ridges which are adapted to extend circumferentially around the pipe ends and which are resiliently engaged with the pipe to space the body portions radially from the pipe. The ridges are continuous and are arranged so that there is a pair of laterally spaced marginal ridges along each circumferential margin of the body portion. There may be one or more ridges located between the marginal pairs of ridges.

The ridges divide the pipe-embracing side of the wrapper into a series of channels adapted to extend circumferentially around the pipe end. The pairs of ridges at the margins define marginal channels and between these marginal channels there are one or more intra-marginal channels depending on the number of additional ridges located between the marginal pairs of ridges. Prior to placement of the wrapper around a joint, all the channels are filled with a suitable mastic compound to the crest of the ridges.

The wrapper is preferably positioned about the pipe joint in stretched condition so that the ridges resiliently engage the pipes with one pair of marginal ridges embracing one of the adjoining pipe ends and the other pair of marginal ridges embraces the other of the adjoining pipe ends. The intervening portions of the wrapper body bridge across the mating abutting end faces of the pipe ends. The mastic in each channel is confined radially by the body portion of the wrapper and is contained against flow axially of the pipes by the ridges. Hence the mastic is pressed firmly against the pipe so that it thoroughly "wets" the pipe surfaces near the joint and is forced into the annular crevice between the end faces of the pipe ends. If there is excess mastic in any particular channel as the strip is applied, the excess will be forced into one of the other channels while the wrapper is applied until a hydrostatic balanced pressure is obtained from one channel to another.

The wrapper may be made advantageously and economically in the form of a straight extruded strip. The strip is preferably delivered to an installation site in a long roll and then cut to length as needed and the mastic coated on the channel side. The coated strip is then wrapped around the pipe joint like a bandage. It may be stretched as desired in the wrapping and then its ends overlapped on each other. Preferably, a mastic is used which is tacky enough to cause the overlapped ends to adhere somewhat at least until a back fill is made. The overlapped ends may be fastened by suitable fasteners such as staples or the like, if there is expected an appreciable delay before the back fill is made.

One of the advantageous features of this strip is that inasmuch as the strip is resilient it will remain snugly engaged with the mastic sealing compound even though the compound is of the type which may shrink upon setting or hardening. This is a property of mastics such as asphalt compositions which are particularly suitable for this purpose.

Another feature of the construction is that because of the confining action of the pairs of marginal ridges, the marginal channels will preserve a snug sealing engagement with their respective pipe ends even though the ends of the pipe may shift to slightly non-axial positions after the joint is made because of settlement of the underlying soil or the like. Also, the ridges prevent the body portion of the wrapper from being squashed against the pipe to extrude the mastic out of the wrapper when the back fill is made over the pipe joints. For these reasons and because the wrapper itself is water impervious, a joint in accordance with this invention is most effective and durable.

The invention will be further explained in connection with the accompanying drawings which illustrate one preferred form of wrapper and a manner of installing it on a pipe.

In the drawings:

FIG. 1 shows a fragment of a wrapper and the pipe-embracing side thereof, the view being drawn in oblique projection;

FIG. 2 shows a longitudinal section of an assembly of the wrapper of FIG. 1 together with a suitable mastic composition about the ends of a pair of pipes;

FIG. 3 is a cross-sectional view of a pipe with the wrapper thereon, the pipe being positioned in a trench;

FIG. 4 is a longitudinal sectional view through an applicator for applying mastic to the strip and showing a portion of the strip extending through the applicator.

The pipe joint wrapper 10 in FIG. 1 is formed of flexible, elastic rubber-like material. It includes a comparatively thin body portion 11 with pairs of marginal ridges 12 and 13, and a central ridge 14 formed along one side of the body portion and forming the pipe-embracing side 17 of the wrapper. The opposite or external side of the wrapper is plane and smooth. The pairs of marginal ridges 12 and 13 define marginal channels 15 and 16, respectively, and the central ridge 14 defines with the pairs of marginal ridges two intra-marginal channels 18 and 19. The ridges are mutually parallel and are of generally triangular cross-sectional shape.

FIGS. 2 and 3 show the way in which the wrapper is disposed around a pipe joint to seal interlocking ends 20 and 21 of a pair of adjoining concrete sewer pipes. These pipes are assembled end to end in a trench in the conventional manner as shown in FIG. 3, and then the wrapper 10 is placed around the joint to seal it before the back fill about the pipe is made. The pipes 20 and 21 are conventional concrete pipes, pipe 20 having an annular externally tapered projection 23 which fits inside an annular rabbet 24 in the adjoining pipe end 21.

The wrapper 10 is preferably delivered to the installation site in rolls and then unreeled and cut off to length as needed to fit around the pipe and overlap the ends. A mastic sealing composition 25 (see FIG. 2) is coated on the wrapper preferably at the installation site as the wrapper strip is unreeled. A convenient way of applying the mastic is by the applicator 30 shown in FIG. 4. Applicator 30 is a simple box with its front side 31 and rear side 32 slotted as at 33 near their bottom edges to permit lengthwise passage of the strip through the box along the bottom of the box. The mastic 25 is ordinarily delivered to the site in buckets or drums and it may be heated, if necessary, to reduce its viscosity so that it may be spread easily. The mastic is then poured into the applicator 30 in a bank as indicated schematically in FIG. 4 by the chain dotted line. The wrapper strip is then fed lengthwise through the slots 33 so that the mastic is spread into the channels by the lower edge of the front slot 33 in the front side 31 of the applicator. Preferably the width of the front slot 33 is equal to the elevation of the ridges plus the thickness of the body 11. The mastic composition is spread over the channeled side of the strip and completely fills the channels up to the crests of the several ridges.

The wrapper strip with the mastic thereon is stretched as it is wrapped around the joint then its ends overlapped. The wrapper strip may be elongated about 10 to 20% of its original length as it is applied. This elongation serves to pack the mastic tightly against the pipe ends and forces it into the annular crevice between the abutting end faces of the pipes. Ordinarily mastic suitable or most desirable for this purpose is sufficiently adhesive to adhere the overlapped ends of the strip to maintain the strip in stretched condition until the trench is backfilled. If desired, however, the overlapped ends may be fastened with suitable fasteners (not shown). A simple multi-prong staple fastener like those commonly used for reinforcing mitered corners of picture frames or household window screens is suitable for this purpose.

In FIG. 2 it may be noted that with the wrapper strip in proper position the marginal ridges 12 circumferentially embrace the pipe end 20 whereas the marginal pair of ridges 13 are similarly engaged with pipe 21. Because the strip is stretched as it is applied, the pairs of ridges 12 and 13 resiliently embrace the external surfaces of the pipes and cooperate with the portions of the body between the ridges to confine the mastic so that the marginal channels form continuous seals around in the respective pipe ends, even though the pipes should settle slightly to a non-axial position relative to each other, the sealing continuity of the marginal channels remains unbroken. Moreover, the ridges tend to prevent the mastic from being squeezed out of the marginal channels by the pressure of the backfill. Inasmuch as the channels are filled to the crests of the ridges, there is a slight excess of mastic under the wrapper as it is stretched about the joint. This excess is packed tightly against the pipe section and forms a bank 34 (FIG. 3) at the junction of the overlapped ends of the wrapper which makes this junction perfectly watertight.

The mastic in the intra-marginal channels 18 and 19 is also maintained snugly against the pipe ends by the ridges 12, 13 and 14 and the body portion 11 and can flow into the crevice between the adjoining end faces of the pipes. The center ridges 14 in the illustrated embodiment normally is seated in or upon the crevice and serves as a guide for aligning the wrapper strip as it is wrapped around the pipe ends.

Many forms of mastic sealing material may be used. Asphalt is very effective for the purpose and is inexpensive. Preferably asphalt is mixed with a suitable filler and a suitable adhesive. A suitable mastic composition for this purpose is made according to the following recipe:

| | Parts by weight |
|---|---|
| Asphalt | 37 |
| Asbestos | 3 |
| High boiling solvent | 17 |
| Finely ground oyster shells | 27 |
| Rubber dust | 11 |
| Cumar resin | 5 |
| | 100 |

The wrapper 10, as previously noted, is preferably extruded rubber-like material. The term rubber-like material includes both natural rubber and also the various synthetic materials having the characteristic extensibility and elasticity of natural rubber. The term also includes flexible elastic materials such as poyvinyl chloride, polyethylene, etc. For concrete sewer pipes of the type illustrated vulcanized strips of butyl scrap rubber have been found to be particularly satisfactory.

Variations in the construction and procedure disclosed may be made within the scope of the appended claims.

We claim:

1. A pipe joint wrapper for buried pipes, said wrapper being entirely of flexible elastic rubber-like material and including a body in the form of a strip adapted to circumferentially embrace both opposing pipe ends of the joint with the ends of the strip overlapping one another, said body having on the pipe-embracing side thereof a pair of laterally spaced ridges along each circumferential margin of the body, and at least one intra-marginal ridge between said pairs of marginal ridges, a mastic sealing composition covering the pipe-embracing side of said body between said ridges, said ridges being adapted to circumferentially engage the pipe ends resiliently and defining with the body portion a series of annular channels for circumferentially encircling the pipe ends to contain mastic sealing material about said pipe ends against flow axially of the pipe.

2. A pipe joint wrapper comprising a thin, flexible elastic rubber strip including a comparatively thin flexible elastic body having a series of parallel laterally-spaced narrow ridges extending lengthwise of the body on one side thereof, there being a ridge along each longitudinal margin of the body and a ridge spaced laterally inward from each marginal ridge, said inwardly spaced ridges being spaced a substantial distance from each other so that they are adapted to flank the mating end faces of adjoining pipe ends at a joint, and a mastic sealing composition entirely covering said ridged side of the body to the elevation of the crest of said ridges, and said strip having a length greater than the circumference around the intended pipe joint so that when the strip is applied, the ends of the strip may be brought into overlapping relation about said joint.

3. In a pipe joint at which opposing pipe ends are assembled with mating faces abutting, a wrapper encircling the junction of said pipe ends to preclude leakage into the pipe, said wrapper being entirely of a flexible elastic water-impervious rubber-like material and resiliently embracing said pipe ends, the wrapper including an elastic body portion in the form of a strip axially flanking said mating abutting faces and having its ends in overlapping relation and including a pair of laterally spaced ridges adjacent each circumferential margin of the body, the pairs of ridges circumferentially engaging the pipe ends and defining with the body two annular circumferential marginal channels and an intra-marginal channel the latter bridging said mating faces between said pairs of ridges, and a mastic sealing composition in said marginal channels and in said intra-marginal channel, said body radially confining said mastic against said pipe ends and said ridges laterally confining the mastic against axial flow.

4. A seal for a pipe joint formed of opposing pipe ends at which mating faces abut, said seal including a flexible elastic water-impervious wrapper strip of rubber-like material adapted to encircle said joint in axial overlapping relation with the adjoining pipe ends, the wrapper strip having a comparatively thin elastic body portion formed of a pair of laterally spaced-apart continuous narrow ridges extending lengthwise of the wrapper strip adjacent the margins thereof on the pipe-embracing side of said body, the pairs of ridges circumferentially encircling their respective pipe ends resiliently and defining with the body two annular circumferential marginal channels which are substantially wider than said ridges and an intra-marginal channel between said pairs of ridges, a mastic sealing composition in said marginal channels and in said intra-marginal channel, said elastic body radially confining said mastic against the pipe ends and said ridges laterally confining said mastic against axial flow, and the ends of the wrapper being connected in overlapping engagement with each other.

References Cited in the file of this patent

UNITED STATES PATENTS

| | | |
|---|---|---|
| 376,458 | Wilbur | Jan. 17, 1888 |
| 662,618 | Camp | Nov. 27, 1900 |
| 1,238,383 | Blumenthal | Aug. 28, 1917 |
| 1,259,833 | Burns | Mar. 19, 1918 |
| 1,558,503 | Pressler | Oct. 27, 1925 |
| 1,823,974 | Ferguson | Sept. 22, 1931 |
| 1,959,421 | Hardesty | May 22, 1934 |
| 1,979,691 | Jackson | Nov. 6, 1934 |
| 2,167,865 | Beecher | Aug. 1, 1935 |
| 2,256,864 | Ferguson | Sept. 23, 1941 |
| 2,267,630 | Weiland | Dec. 23, 1941 |
| 2,313,074 | Jewell | Mar. 9, 1943 |
| 2,354,485 | Slaughter | July 25, 1944 |
| 2,616,736 | Smith | Nov. 4, 1952 |
| 2,739,089 | Hageltorn | Mar. 20, 1956 |
| 2,751,236 | Wyatt | June 19, 1956 |